April 29, 1952     C. H. PHELPS     2,594,581
BALANCE TESTING MACHINE ROTOR MOUNTING
Filed July 26, 1946
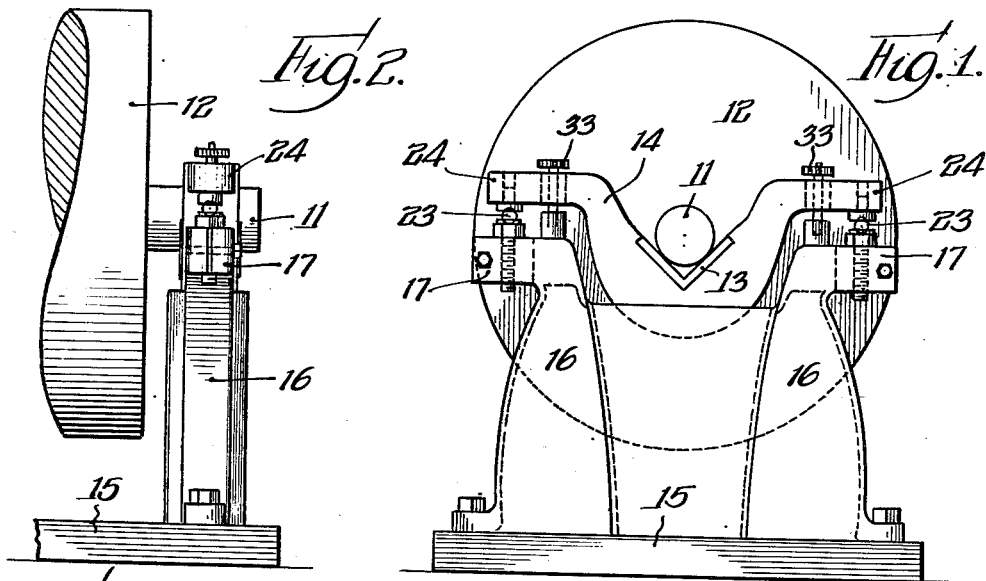
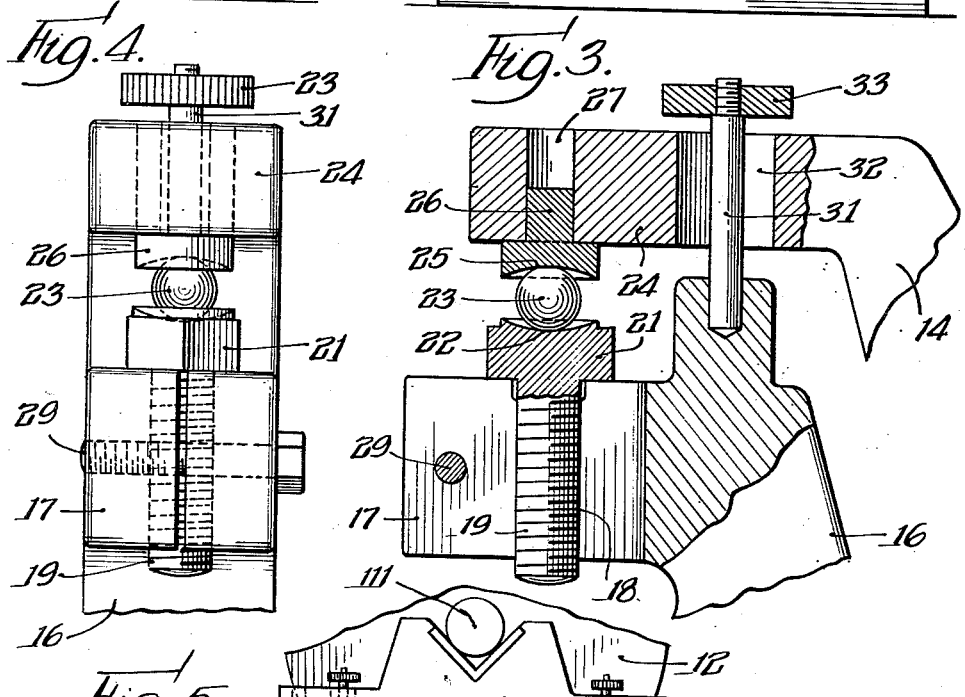
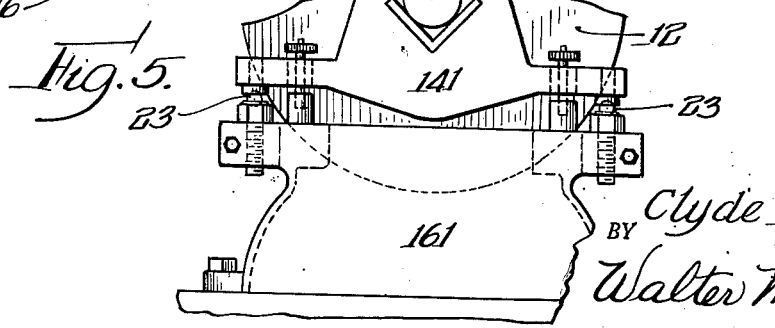
INVENTOR.
BY Clyde H. Phelps
Walter M. Fuller
atty.

Patented Apr. 29, 1952

2,594,581

UNITED STATES PATENT OFFICE 2,594,581

BALANCE TESTING MACHINE ROTOR MOUNTING

Clyde H. Phelps, Springfield, Ill., assignor, by mesne assignments, to Gisholt Machine Company, Madison, Wis., a corporation of Wisconsin Application July 26, 1946, Serial No. 686,415

5 Claims. (Cl. 73—66)

Balance testing machines in general incorporate means to permit the rotor undergoing test and its bearing carriage or support to oscillate or vibrate in at least one plane, usually the horizontal plane.

It is desirable to embody in the rotor-bearing supporting carriage some suitable means of control over the natural period of oscillation of such support because of its effect on the phase angle of the vibration caused by the unbalance present in the revolving rotor undergoing examination as to its balance or degree of unbalance.

Such supporting means for the bearing carriage as piano or music wire, either rigidly fastened or with the knife edge bearings, between the machine frame and the rotor-bearing carriage are often employed for this purpose wherein the normal period of vibration is under control by the perpendicular length of the sustaining wire or wires of the hanger suspension.

Obviously, however, such wire or wires or pendulum must necessarily be very long to secure a desirable low inherent period of oscillation and this requires a very high machine frame and, therefore, it presents a difficult or objectionable design of balance testing apparatus wherein it is desirable to have a low natural period of oscillation of the bearing carriage assembly.

One of the outstanding and paramount aims and objects of the present invention is to provide a simple, inexpensive means for mounting the rotor-bearing support or carriage, substantially friction free, with means of control of the normal or inherent period of oscillation and without any increase in the size of machine frame or rotor-bearing carriage dimensions and without the undesirable spring action or stretch or such material as piano or music wire or the like as such link is entirely eliminated.

In order that those skilled and trained in this art may readily understand this invention and its structural and functional advantages a present preferred embodiment of the invention in desirable physical form has been illustrated in the accompanying drawing forming a part of this specification and to which reference should be had in connection with the following detailed description, like reference numerals having been used to designate the same structural parts or elements in the plurality of figures of the drawing.

In this drawing:

Figure 1 is a face view of one of the novel and improved supports for one of the rotor bearings of which, of course, there would normally be two, that is, one at each end of the rotor;

Figure 2 is an edge view of that portion of the structure presented in Figure 1;

Figure 3 is a section on an enlarged scale of one of the two like bearing supports shown in Fig. 1;

Figure 4 is an edge view of the appliance set forth in Figure 3; and

Figure 5 is a slightly modified type of construction.

Referring first to Figures 1 and 2, it will be noted that one end portion of shaft 11 of the rotor 12 undergoing examination is supported for rotation, by motive means not shown, in a V-bearing 13 mounted on the support or carriage 14 of the shape depicted in Figure 1, a pair of such bearing means being employed, one for each end of the rotor, of which one only need be illustrated.

The V-bearing 13 provides a straight groove or valley having converging surfaces which when they lie tangent to the shaft end 11 align the supporting member 14 substantially in a vertical plane at right angles to the axis of shaft 11 when the axis of the shaft 11 is horizontal. The support or carriage 14 is a rigid yoke shaped member. It comprises a central trough shaped portion with two arms of approximately equal length extending horizontally on opposite sides of the vertical longitudinal plane of the groove or valley of bearing 13. These oppositely disposed arms 24 carry downwardly facing cups having spherical concaved faces 25. Said cups are disposed at substantially equal distances from the vertical plane of the groove of the bearing 13. These downwardly facing cups lie at a level which in the preferred form shown in Figures 1 to 4 is approximately at or above the level of the axis of the shaft 11 supported in the groove or valley of the bearing 13. With this construction, the friction of the shaft end 11 in the bearing 13, when the rotor is moving in, for example, a clockwise direction in Figure 1 produces a torque upon member 14, which torque is resisted by the downward pressure of the cup at the right hand arm 24 upon the ball 23 underneath. Driving torque applied to the driving rotor in a substantially tangential direction has little or no effect upon the stability and sensitiveness of the suspension.

Suitably mounted on an appropriate base 15 are a pair of hollow standards 16, 16 and the vertically split extension 17 outstanding from the top portion of each such element 16 is provided with an upright, screw threaded aperture 18 therethrough (Fig. 3) occupied by a vertically adjustable screw 19 having an enlarged, externally polygonal, top head 21 shown, but not necessarily, bearing on the top flat surface of the part 17 and having a concave, partially spherical, top surface or seat 22 occupied by a spherical, supporting ball 23 which in turn sustains the overhanging part 24 of bearing carriage 14 by engaging or occupying the underside, partially spherical, concave surface or seat 25 of the head of a member 26 having a shank tightly fitted in the lower portion of a vertical hole or aperture 27 through the part 24.

The cooperating curved surfaces of the two pairs of three elements 21, 23 and 25 are each hardened, ground, and polished to efficiently perform their supporting functions, and the construction is such that the bearing carriage 14 may oscillate in any direction in the horizontal plane due to the rolling action of balls 23, 23 and the definite centering tendency of the balls to seek the lowest position.

The natural period of oscillation of the bearing carriage 14 is controlled by the radius of curvature of the partially spherical seats 22, 22 and 25, 25 which are always greater than the radius of the balls 23, 23 to maintain rolling action rather than sliding or frictional turning.

Therefore, a low natural frequency of oscillation may be obtained by merely using a long radius of curvature in the seats 22, 22 and 25, 25 such that the equivalent pendulum of great length may be obtained without any change in either the carriage or machine frame and always in a relatively small space. Accordingly, a short pendulum or high natural frequency may be obtained by the use of short radius of curvature of the same seats.

It is clear that this invention provides a simple, rigid, self centering mounting, substantially friction free, where, in effect, a pendulum of great length may be incorporated in small space and any desired natural period of oscillation secured.

The suspension is stable and maintains a high degree of sensitivity at all times. No matter how short or long the radius of swing of the shaft end may be due to the location of the nodal point, the same periodicity is maintained at each end, since in no matter what direction in a horizontal plane the vibration occurs, the same arcuate path is followed, since the curvature of the cups in any direction is the same, because the cups are spherical in shape.

It is to be understood that in each instance the two seats or surfaces 22 and 25 constituting parts of spheres with which the intervening spherical ball 23 performs its supporting function need not necessarily be of the same radius.

The fact that the stem 19 of the element 21 is screw-threaded provides means for raising or lowering one or more of the hangers 24 to accommodate different diameters of rotor shafts 11 at either end of the rotor and such adjustment may be secured by temporarily slightly loosening the transverse clamping screw 29 and, after the adjustment has been made, again tightening such screw to maintain the parts in fixed position. For example, the foregoing would provide properly in a case where the two parts 11 at the opposite ends of the rotor are of different diameters, and where the pair of elements 21, one of which is shown in Figure 1, may be adjusted, raising or lowering the bearing carriage 24 until the rotor shaft is level.

In order to hold the bearing support 14 on the machine when the test rotor is removed from the bearings 13, the appliance includes for each part 24 a pin 31 suitably mounted on its member 16 and extending up through a slot 32 in the part 24, the top end of the pin being screw threaded and on which is fitted a suitable retainer 33, the size of slot 32 being such with relation to the pin 31 that there is no contact between the parts 31 and 24 in the normal operation of the mechanism.

Figure 5 presents a slightly modified form of construction embodying this invention wherein the rotor shaft center 111 is mounted above the centers of the balls 23, 23, whereas the construction presented in Figures 1 and 2 provides a more stable mounting of the center of the rotor shaft below the centers of the corresponding supporting balls 23, 23, equivalent results being obtained, however, in either case, the only differences being the shapes of the bearing carriages characterized 14 in Figure 1 and designated as 141 in Figure 5 and the employment of two standards 16, 16 in Figure 1, and a single supporting structure characterized 161 in Figure 5.

Those skilled in this art will readily understand that whereas this construction has been set forth in detail both by drawing and description, the invention is not necessarily limited and restricted to such precise features, and reasonable modifications may be resorted to without departure from the substance and essence of the invention, and without the loss or sacrifice of any of its material benefits and advantages.

I claim:

1. In a device of the class described, a rigid bearing support member comprising a central body portion having arms extending horizontally in opposite directions from the opposite sides of the body portion, said body portion having a transverse upwardly facing bearing groove for receiving a cylindrical shaft end of a rotor to be tested and aligning itself therewith, a downwardly facing substantially concave cup member carried on each arm, the corresponding cup members being mounted on said arms at a substantial distance from the center of the groove, said cup members lying in a common vertical plane at right angles to the longitudinal axis of the bearing groove substantially midway of the length of the groove, a pedestal member having spaced upwardly facing substantially concave cup members in vertical alignment with the downwardly facing cup members, said upwardly facing cup members lying on substantially the same level, and a spherical bearing ball of substantially smaller curvature than that of said cup members disposed in and between each pair of vertically aligned cups.

2. The combination of claim 1 wherein the bearing groove in the central body portion extends below the level of said spherical bearings whereby the axis of the supported shaft end will lie approximately at or below the level of the downwardly facing cups.

3. The combination of claim 1 wherein the upwardly facing cup members have screw threaded stems by which the elevation of said cups may be varied to support shaft ends of various diameters with the axis thereof substantially level.

4. In a balance testing machine, a base having a pair of spaced pedestals, a rotor bearing support member mounted on each pedestal for free vibration in any direction in a horizontal plane at a fixed frequency of vibration, each pedestal having a pair of spaced substantially concave upwardly facing bearing cups, a ball bearing in each cup free to roll therein in any direction horizontally, each rotor bearing support member being yoke shaped and having a central portion with a bearing cradle for receiving and aligning itself with a shaft end of a rotor under examination and arms extending laterally on each side of the bearing cradle, said arms and said bearing cradle lying substantially in a vertical plane normal to the axis of a shaft end supported in the cradle, a pair of downwardly facing substantially concave bearing cups secured to the corresponding arms of each support member at substantially equal distances from the bearing cradle thereof and registering vertically with the upwardly facing bearing cups and resting upon the spherical balls in the latter, the curvature of said ball being substantially less than that of either of said cup members engaging the same.

5. A balance testing machine comprising a rigid stationary base having a pair of spaced upwardly extending pedestals, a movable bearing support above each pedestal and supported thereupon, each bearing support having means for receiving a rotor shaft of a rotor to be tested and providing a temporary bearing therefor, downwardly facing substantially concave cups fastened on said bearing supports, upwardly facing substantially concave cups carried by said pedestals and registering vertically with said downwardly facing cups, and interposed balls in said cups and of substantially smaller curvature than that of the cups, and retainer means interlocking the pedestals and the corresponding bearing supports for limiting the motion both vertically and horizontally of the downwardly facing cups relative to the upwardly facing cups, each of said retainer means having frictionless lost motion clearance permitting unrestrained motion in any horizontal direction of said bearing supports in normal use but preventing separation of the cups to the extent of permitting escape of the balls.

CLYDE H. PHELPS.

REFERENCES CITED

The following references are of record in the file of this patent:

UNITED STATES PATENTS

| Number | Name | Date |
| --- | --- | --- |
| 2,001,826 | Russell et al. | May 21, 1935 |
| 2,386,470 | Jenkins | Oct. 9, 1945 |
| 2,414,506 | Bowen | Jan. 21, 1947 |
| 2,449,429 | Van De Grift et al. | Sept. 14, 1948 |

FOREIGN PATENTS

| Number | Country | Date |
| --- | --- | --- |
| 327,529 | Great Britain | Apr. 10, 1930 |
| 157,962 | Great Britain | Apr. 10, 1922 |